(12) United States Patent  
Schulze

(10) Patent No.: US 9,458,004 B2
(45) Date of Patent: Oct. 4, 2016

(54) FUELING NOZZLE FOR GASEOUS FUELS WITH INTEGRATED MEANS FOR GAS DETECTION

(75) Inventor: Jörg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 771 days.

(21) Appl. No.: 13/018,705

(22) Filed: Feb. 1, 2011

(65) Prior Publication Data
US 2012/0192990 A1  Aug. 2, 2012

(51) Int. Cl.
B67D 7/32 (2010.01)
F17C 5/06 (2006.01)
H01M 8/04 (2016.01)

(52) U.S. Cl.
CPC .............. *B67D 7/3209* (2013.01); *F17C 5/06* (2013.01); *F17C 2205/037* (2013.01); *F17C 2221/012* (2013.01); *F17C 2223/0123* (2013.01); *F17C 2223/036* (2013.01); *F17C 2260/038* (2013.01); *F17C 2265/065* (2013.01); *F17C 2270/0184* (2013.01); *H01M 8/04089* (2013.01); *H01M 2250/20* (2013.01); *Y02E 60/321* (2013.01); *Y02T 90/32* (2013.01)

(58) Field of Classification Search
USPC ....... 141/94–96, 192, 197, 198, 382, 392, 4, 141/57; 73/40, 40.5 R, 49.1
See application file for complete search history.

(56) References Cited

U.S. PATENT DOCUMENTS

| | | | | |
|---|---|---|---|---|
| 5,042,290 | A | * | 8/1991 | Geisinger .................. 73/40.5 R |
| 5,992,395 | A | * | 11/1999 | Hartsell et al. ................ 123/516 |
| 6,418,983 | B1 | * | 7/2002 | Payne et al. ..................... 141/59 |
| 7,028,724 | B2 | * | 4/2006 | Cohen et al. .................... 141/94 |
| 7,191,805 | B2 | * | 3/2007 | Cohen et al. ..................... 141/4 |
| 2005/0276749 | A1 | | 12/2005 | Noujima et al. |
| 2011/0194294 | A1 | * | 8/2011 | Stone ............................ 362/341 |
| 2011/0247726 | A1 | * | 10/2011 | Okawachi ....................... 141/82 |

* cited by examiner

*Primary Examiner* — Mark A Laurenzi
*Assistant Examiner* — Timothy P Kelly
(74) *Attorney, Agent, or Firm* — Fraser Clemens Martin & Miller LLC; James D. Miller

(57) ABSTRACT

A fueling nozzle for dispensing a gaseous fuel to a vehicle includes a main body having a conduit formed therein and configured to permit the gaseous fuel to flow therethrough. The conduit terminates at a dispensing end of the main body. The dispensing end of the main body forms an interface with a fuel inlet of the vehicle during a fueling operation. The fueling nozzle further includes a sensor disposed at the dispensing end of the main body adjacent the conduit. The sensor is configured to detect a leakage of the gaseous fuel during the fueling operation.

15 Claims, 3 Drawing Sheets

FUELING NOZZLE FOR GASEOUS FUELS WITH INTEGRATED MEANS FOR GAS DETECTION

FIELD OF THE INVENTION

The present disclosure relates to a system and method for refueling a hydrogen fuel cell powered vehicle and, more particularly, to a nozzle for refueling the hydrogen fuel cell powered vehicle.

BACKGROUND OF THE INVENTION

A fuel cell has been proposed as a clean, efficient and environmentally responsible power source for electric vehicles and various other applications. In particular, the fuel cell has been identified as a potential alternative to the traditional internal-combustion engine used in modern vehicles.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA). The MEA is often disposed between porous diffusion media (DM) which facilitate a delivery of gaseous reactants, typically hydrogen and oxygen, for an electrochemical fuel cell reaction. Individual fuel cells can be stacked together in series to form a fuel cell stack capable of powering a hydrogen fuel cell powered vehicle.

In order for hydrogen fuel cell powered vehicles to be a viable option for consumers, fueling stations must be capable of reliably dispensing gaseous hydrogen fuel. Dispensing systems for gaseous fueling typically installed at fueling stations are deemed operable after leak checks have been conducted. The leak checks during installation do not provide an opportunity to detect leakage that may occur during the operating lifetime of the dispensing systems, however. The installation leak checks also do not permit one to determine whether an interference leak during fueling of a particular vehicle is occurring. Generally, only major leaks due to line shear or hose damage, for example, are detected during the operating lifetime of the dispensing systems. Minor leakages at the vehicle interface are typically not detectable by fueling stations and customers, which results in an undesirable release of the gaseous hydrogen fuel to the environment.

A known system for dispensing hydrogen fuel is disclosed in U.S. Pat. Appl. Pub. No. 2005/0276749 to Noujima et al., the entire disclosure of which is hereby incorporated herein by reference. Noujima et al. describes a hydrogen fuel supplying machine generally made up of a fuel supply nozzle having an antenna for receiving data to be sent by a sensor net, which are flow rate sensors disposed downstream of a valve, a central processing unit for processing the transmitted data to determine an open degree of the valve, a memory for storing therein the sent data and the processing results of the central processing unit, and a valve control unit for controlling the valve in deference to the central processing unit's processing results. Noujima et al. additionally states that, by attaching the flow rate sensor to any part of a pipeline extending from the gaseous fuel stock unit up to the fuel supply nozzle, it becomes possible to rapidly detect gas leakage and flow abnormalities. However, the hydrogen fuel supplying machine and fuel supply nozzle of Noujima et al. cannot detect leakage that may occur at the interface of the fuel supply nozzle and a fuel cell powered vehicle during a fueling operation of the fuel cell powered vehicle.

There is a continuing need for a system and method for continuous leak detection during gaseous fueling of fuel cell powered vehicles.

SUMMARY OF THE INVENTION

In concordance with the instant disclosure, a system and method for continuous leak detection during gaseous fueling of fuel cell powered vehicles, is surprisingly discovered.

In a first embodiment, a fueling nozzle for dispensing a gaseous fuel to a vehicle includes a main body and a sensor. The main body has a conduit formed therein. The conduit permits the gaseous fuel to flow therethrough. The conduit terminates at a dispensing end of the main body. The dispensing end of the main body forms an interface with a fuel inlet of the vehicle during a fueling operation. The sensor is disposed at the dispensing end of the main body adjacent the conduit. The sensor is configured to detect a leakage of the gaseous fuel during the fueling operation.

In another embodiment, a system for detecting leakage of a gaseous fuel during a fueling operation of a vehicle includes a dispenser, a flexible fuel line, and a fueling nozzle. The dispenser selectively dispenses the gaseous fuel. The flexible fuel line is in fluid communication with the dispenser. The fueling nozzle is in fluid communication with the flexible fuel line for dispensing the gaseous fuel. The fueling nozzle includes a main body having a conduit formed therein. The conduit permits the gaseous fuel to flow therethrough. The conduit terminates at a dispensing end of the main body. The dispensing end of the main body forms an interface with a fuel inlet of the vehicle during the fueling operation. The sensor is disposed at the dispensing end of the main body adjacent the conduit. The sensor is configured to detect a leakage of the gaseous fuel during the fueling operation.

In a further embodiment, a method for detecting leakage of a gaseous fuel during a fueling operation of a vehicle includes steps of: providing a system including a dispenser for selectively dispensing the gaseous fuel, a flexible fuel line in fluid communication with the dispenser, and a fueling nozzle with a main body having a conduit formed therein and configured to permit the gaseous fuel to flow therethrough, the conduit terminating at a dispensing end of the main body, and a sensor disposed at the dispensing end of the main body adjacent the conduit; providing the vehicle having a fuel inlet configured to receive the gaseous fuel; inserting the fueling nozzle into the fuel inlet of the vehicle, an interface formed between the dispensing end of the fueling nozzle and the fuel inlet; and causing the gaseous fuel to flow from the dispenser to the fueling nozzle for dispensing the gaseous fuel to the vehicle, wherein the sensor is configured to detect a leakage of the gaseous fuel at the interface during the fueling operation.

DRAWINGS

The above, as well as other advantages of the present disclosure, will become readily apparent to those skilled in the art from the following detailed description, particularly when considered in the light of the drawings described herein.

Figure 3:
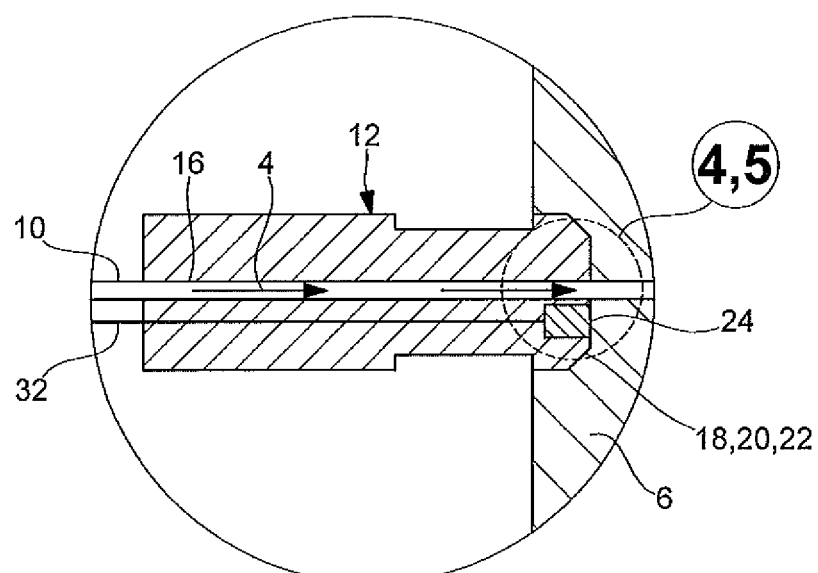
FIG. 3 is an enlarged fragmentary side cross-sectional view of the fueling nozzle shown in FIG. 1, further illustrating a fueling operation of a vehicle with the fueling nozzle.
Figure 4:
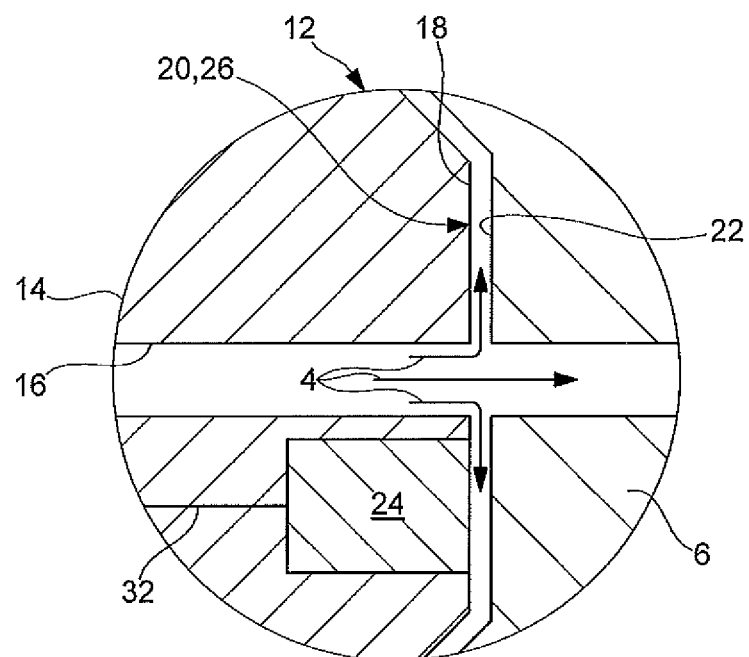
Figure 5:
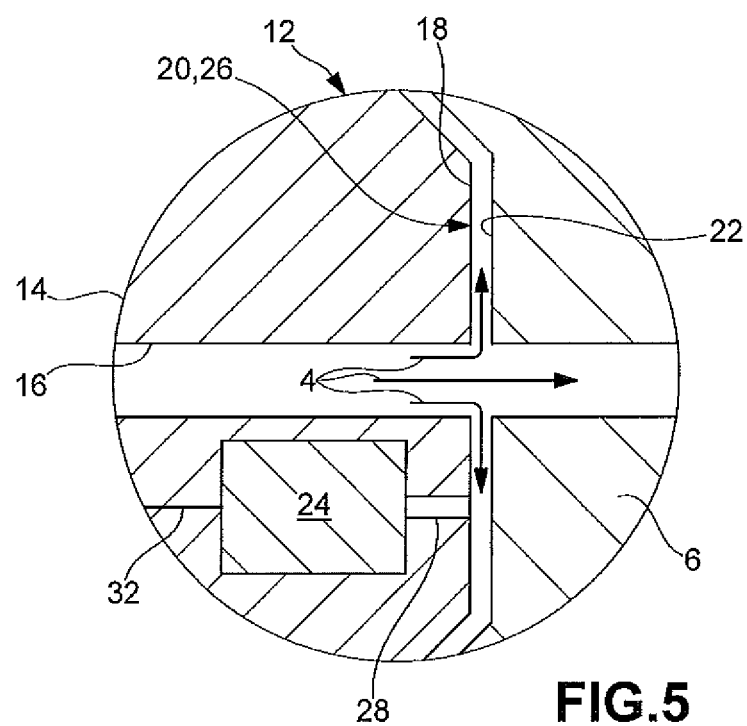

FIG. 4 is an enlarged fragmentary side cross-sectional view of the fueling nozzle shown in FIG. 3, further illustrating continuous leakage detection by the fueling nozzle at the interface between the fueling nozzle and the vehicle; and FIG. 5 is an enlarged fragmentary side cross-sectional view of the fueling nozzle according to another embodiment of the present disclosure having a sniffing line in communication with a sensor, and further illustrating continuous leakage detection by the fueling nozzle at the interface between the fueling nozzle and the vehicle.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Referring now to FIGS. 1-5, the present disclosure includes a system 2 for detecting leakage of a gaseous fuel 4 during a fueling operation of a vehicle 6 (shown in FIGS. 4 and 5). As a nonlimiting example, the vehicle 6 may be a fuel cell powered vehicle. The system 2 includes a dispenser 8 for selectively dispensing the gaseous fuel 4 such as gaseous hydrogen. A flexible fuel line 10 is in fluid communication with the dispenser 8. A fueling nozzle 12 is in fluid communication with the flexible fuel line 10 for dispensing the gaseous fuel 4 to the vehicle 6 during a fueling operation.

The fueling nozzle 12 of the present disclosure includes a main body 14 having a conduit 16 formed therein. The conduit 16 is configured to permit the gaseous fuel 4 to flow therethrough. The conduit 16 terminates at a dispensing end 18 of the main body 14. The dispensing end 18 of the main body 14 forms an interface 20 (shown in FIGS. 3-5) with a fuel inlet 22 of the vehicle 6 during the fueling operation. A sensor 24 is disposed at the dispensing end 18 of the main body 14 adjacent the conduit 16. The sensor 24 is configured to detect a leakage of the gaseous fuel 4 during the fueling operation of the vehicle 6.

Figure 2:
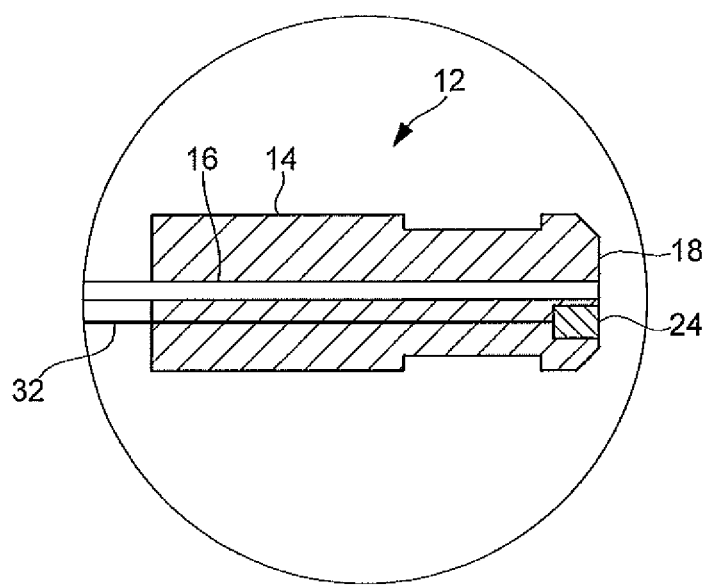
FIG. 2 is an enlarged fragmentary side cross-sectional view of the fueling nozzle shown in FIG. 1.

In a particular embodiment shown in FIGS. 2-4, the sensor 24 is exposed at the dispensing end 18 of the main body 14 and detects leakage of the gaseous fuel 4 during the fueling operation. For example, a gap 26 may exist at the interface 20 between the dispensing end 18 of the main body 14 and a portion of the vehicle 6 adjacent the fuel inlet 22 due to a misalignment of the fueling nozzle 12 with the fuel inlet 22. Alternatively, the gap 26 may result from interference between the fuel inlet 22 and the dispensing end 18, for example, due to a damaged fueling nozzle 12. Where a polymeric seal (not shown) is employed between the fueling nozzle 12 and the fuel inlet 22 of the vehicle 6, the leakage may result from undesirably seal degradation during the operating lifetime of the fueling nozzle 12. It should also be appreciated that other leakage of the gaseous fuel 4 at the interface 20 may also be detected by the sensor 24.

The sensor 24 may emit a sensor signal, for example, to set off an alarm or actuate a shut-off device in communication with the sensor 24. The sensor 24 may be disposed above or below the conduit 16, as desired. A skilled artisan should appreciate that a density of the gaseous fuel relative to air may dictate whether the sensor 24 is disposed above or below the conduit 16. Multiple sensors 24 surrounding the conduit 16 may also be employed within the scope of the present disclosure.

The fueling nozzle 12 may also have a sniffing line 28 in fluid communication with the sensor 24, as shown in FIG. 5. The sniffing line 28 is configured to deliver a portion of the gaseous fuel 4 leaking at the interface 20 to the sensor 24. In certain embodiments, the sniffing line 28 may be placed under a vacuum in order to draw the portion of the gaseous fuel 4 leaking at the interface 20. The sniffing line 28 permits the sensor 24 to be disposed at a location other than at a surface of the dispensing end 18. For example, the sensor 24 may be inset in the main body 14, and the sniffing line disposed between the sensor 24 and the dispensing end 18 of the main body 14. One of ordinary skill in the art should appreciate that the sensor 24 may be placed at any other suitable location within the main body 14 of the fueling nozzle 12, as desired.

In an illustrative embodiment, the sensor 24 is a hydrogen sensor, and the dispenser 8 of the system 2 selectively dispenses gaseous hydrogen as the gaseous fuel 4. A skilled artisan may select a suitable type of sensor 24 for detecting the hydrogen leakage. As nonlimiting examples, the sensor 24 for detecting hydrogen leakage may include one of a micro-fabricated point-contact hydrogen sensor, an optical fiber hydrogen sensor, a MEMS hydrogen sensor, a thin-palladium film sensor, a thick-palladium film sensor, and a Schottky diode-based hydrogen gas sensor. Other types of hydrogen sensors may also be employed, as desired. One of ordinary skill in the art should also understand that use of the system 2 and a method of the present disclosure for detecting leakage of other types of gaseous fuel 4 is also within the scope of the present disclosure.

The present disclosure further includes a method for detecting leakage of the gaseous fuel 4 during the fueling operation of the vehicle 6. The method first includes the steps of providing the system 2 for dispensing the gaseous fuel 4 and the vehicle 6 having the fuel inlet 22 configured to receive gaseous fuel from the system 2. The fueling nozzle 12 is inserted into the fuel inlet 22 of the vehicle 6. The interface 20 is formed between the dispensing end 18 of the fueling nozzle 12 and the portion of the vehicle 6 adjacent the fuel inlet 22. The gaseous fuel 4 is then caused to flow from the dispenser 8 to the fueling nozzle 12 for dispensing the gaseous fuel 4 to the vehicle 6, for example, by a customer operating the dispenser 8. As disclosed hereinabove, the sensor 24 is configured to detect the leakage of the gaseous fuel 4 at the interface 20 during the fueling operation.

Figure 1:
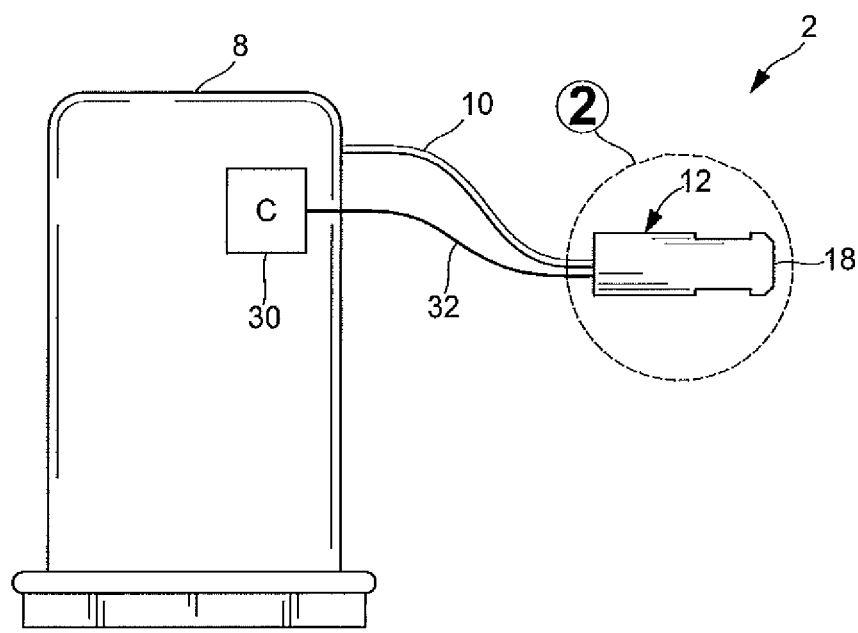
FIG. 1 is a schematic side elevational view of a fuel system for gaseous fuels including a fueling nozzle according to one embodiment of the present disclosure.

With renewed reference to FIG. 1, the system 2 may further include a controller 30 in communication with the sensor 24. In one example, the controller 30 is configured to shut down a supply of the gaseous fuel 4 from the dispenser 8 to the fueling nozzle 12. In another example, the controller 30 provides an alarm to one of a station, the customer, and maintenance personnel indicating that there is the leakage of the gaseous fuel 4 at the interface 20. The sensor 24 may be at least one of wired to the controller, for example, with a communication line 32, and disposed in wireless communication with the controller 30. In operation, the sensor 24 may be used to continuously detect and communicate with the controller 30 so that the controller 30 can take appropriate action with respect to the leakage of the gaseous fuel 4 occurring at the interface 20 during the fueling operation. The system 2 and the method for continuous leak detection during gaseous fueling of vehicles 6 is thereby advantageously provided.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fueling nozzle for dispensing a gaseous fuel to a vehicle, comprising:
   a main body having a conduit formed therein and configured to permit the gaseous fuel to flow therethrough, the conduit terminating at a dispensing end of the main body, the dispensing end of the main body forming an interface with a fuel inlet of the vehicle during a fueling operation, the fuel inlet of the vehicle receiving the dispensing end, wherein a terminal surface of the dispensing end is oriented transverse to the conduit, the terminal surface is configured to contact the fuel inlet of the vehicle at the interface, and the terminal surface is located at a distal end of the main body; and
   a sensor disposed at the terminal surface of the dispensing end of the main body, the sensor configured to detect a leakage of the gaseous fuel during the fueling operation.

2. The fueling nozzle of claim 1, wherein the sensor is exposed at the dispensing end of the main body.

3. The fueling nozzle of claim 1, wherein the sensor is a hydrogen sensor.

4. The fueling nozzle of claim 1, wherein the sensor is in signal communication with a controller configured to at least one of shut down a supply of the gaseous fuel to the fueling nozzle and provide an alarm when there is a leakage of the gaseous fuel at the interface.

5. The fueling nozzle of claim 4, wherein the sensor is one of in wired communication with the controller and in wireless communication with the controller.

6. A system for detecting leakage of a gaseous fuel during a fueling operation of a vehicle, comprising:
   a dispenser for selectively dispensing the gaseous fuel;
   a flexible fuel line in fluid communication with the dispenser; and
   a fueling nozzle in fluid communication with the flexible fuel line for dispensing the gaseous fuel, the fueling nozzle including a main body having a conduit formed therein and configured to permit the gaseous fuel to flow therethrough, the conduit terminating at a dispensing end of the main body, the dispensing end of the main body forming an interface with a fuel inlet of the vehicle during a fueling operation, the fuel inlet of the vehicle receiving the dispensing end, wherein a terminal surface of the dispensing end is oriented transverse to the conduit, the terminal surface is configured to contact the fuel inlet of the vehicle at the interface, and the terminal surface is located at a distal end of the main body, and a sensor is disposed at the terminal surface of the dispensing end of the main body, the sensor configured to detect a leakage of the gaseous fuel during the fueling operation.

7. The system of claim 6, wherein the sensor is exposed at the dispensing end of the main body.

8. The system of claim 6, wherein the sensor is a hydrogen sensor.

9. The system of claim 6, wherein the sensor is in signal communication with a controller configured to at least one of shut down a supply of the gaseous fuel to the fueling nozzle and provide an alarm indicating that there is a leakage of the gaseous fuel at the interface.

10. The system of claim 9, wherein the sensor is one of wired communication with the controller and in wireless communication with the controller.

11. The system of claim 9, wherein the controller is disposed on the dispenser.

12. A method for detecting leakage of a gaseous fuel during a fueling operation of a vehicle, comprising the steps of:
   providing a system including a dispenser for selectively dispensing the gaseous fuel, a flexible fuel line in fluid communication with the dispenser, and a fueling nozzle in communication with the fuel line and including a main body having a conduit formed therein and configured to permit the gaseous fuel to flow therethrough, the conduit terminating at a dispensing end of the main body, the dispensing end of the main body forming an interface with a fuel inlet of the vehicle during a fueling operation, the fuel inlet of the vehicle receiving the dispensing end, wherein a terminal surface of the dispensing end is oriented transverse to the conduit, the terminal surface is configured to contact the fuel inlet of the vehicle at the interface, and the terminal surface is located at a distal end of the main body, and a sensor is disposed at the terminal surface of the dispensing end of the main body adjacent the conduit;
   inserting the fueling nozzle into a fuel inlet of the vehicle; and
   causing the gaseous fuel to flow from the dispenser to the fueling nozzle for dispensing the gaseous fuel to the vehicle, wherein the sensor is configured to detect a leakage of the gaseous fuel during the fueling operation.

13. The method of claim 12, wherein the sensor is in signal communication with a controller that at least one of shuts down a supply of the gaseous fuel to the fueling nozzle and provides an alarm when there is the leakage of the gaseous fuel at the interface when the sensor detects the leakage of the gaseous fuel during the fueling operation.

14. The method of claim 12, wherein the sensor is exposed at the dispensing end of the main body.

15. The method of claim 12, wherein the sensor is a hydrogen sensor.

* * * * *